(12) United States Patent
Rogers et al.

(10) Patent No.: US 8,059,599 B1
(45) Date of Patent: Nov. 15, 2011

(54) GATEWAY ASSIGNMENT FUNCTION

(75) Inventors: Frederick C. Rogers, Overland Park, KS (US); Jeremy Breau, Kansas City, MO (US); Manish Mangal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 679 days.

(21) Appl. No.: 11/696,480

(22) Filed: Apr. 4, 2007

(51) Int. Cl.
*H04W 4/00* (2009.01)

(52) U.S. Cl. ........ 370/331; 370/352; 455/436; 455/439; 455/442

(58) Field of Classification Search .................. 370/331, 370/352, 310, 349, 338, 328, 320; 455/410, 455/445, 436
See application file for complete search history.

(56) References Cited

U.S. PATENT DOCUMENTS

| 6,956,846 | B2 | 10/2005 | Lewis et al. | |
|---|---|---|---|---|
| 7,620,015 | B2 | 11/2009 | Lenzarini | |
| 2004/0235455 | A1 | 11/2004 | Jiang | |
| 2005/0232186 | A1* | 10/2005 | Karaoguz et al. | 370/328 |
| 2006/0229090 | A1* | 10/2006 | LaDue | 455/507 |
| 2008/0102843 | A1* | 5/2008 | Todd et al. | 455/445 |
| 2008/0117884 | A1* | 5/2008 | Ishii et al. | 370/338 |
| 2008/0130596 | A1* | 6/2008 | Kalhan | 370/338 |
| 2008/0273493 | A1* | 11/2008 | Fong | 370/330 |

FOREIGN PATENT DOCUMENTS

WO  WO 2005117463 A2  12/2005

\* cited by examiner

*Primary Examiner* — Kamran Afshar
*Assistant Examiner* — Shahriar Behnamian

(57) ABSTRACT

A system, a method and computer-readable media for establishing connectivity over a plurality of access technologies. A system is provided that includes a client device. The client device is configured to communicate over a network by utilizing at least two access technologies. The system also includes a gateway in communication with the client device. The gateway includes multiple access technology termination nodes configured to support communications utilizing multiple access technologies. A gateway assignment manager is also included in the system. This manager is configured to assign the client device to the gateway. The gateway assignment manager is further configured to maintain the assignment of the client device to the gateway when the client device switches from utilizing a first access technology to utilizing a second access technology.

19 Claims, 6 Drawing Sheets

GATEWAY ASSIGNMENT FUNCTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Recent developments in wireless telecommunications have ushered in a new era of mobility. The advent of cellular and personal communications services has enabled people to maintain communication from virtually any location. Further, advanced technology has facilitated not only wireless voice communication but also wireless data communication, such as the ability to communicate over computer networks and to send and receive data and other content.

Wireless communications systems have existed for many years. In general, a wireless communications system uses mobile or fixed radios that communicate with a fixed radio tower that is in turn interconnected to a larger telecommunications network. Such systems can take a variety of forms. For example, traditional cellular communications systems provide radio coverage to a wide area, such as a city, through use of many radio towers. Typically, subscribers to wireless service are equipped with one or more wireless terminals or "client devices," which may take any of a variety of forms. By way of example, a wireless client device may be a telephone, a pager, a computer, a personal digital assistant ("PDA") or any combination of these or other devices. A wireless client device may be configured to receive and/or convey information such as voice and data (e.g., fax, e-mail and other text messages) and/or other media (e.g., audio, video and graphics). Further, the client device may include input and output facilities such as a touch-pad, a keyboard, a camera, a display, a microphone and/or a speaker. Some client devices are equipped with web browsing software to allow subscribers to communicate with web servers over an Internet Protocol (IP) network (i.e., the Internet).

Wireless networks and mobile wireless devices may use a number of channels to transmit and receive information, and a properly equipped wireless device can initiate communications by sending an initiation request message over one of these channels. Applying industry standards, the initiation request message may include a code that characterizes the requested communication as packet-data communication, as compared with traditional voice communication.

With the rapid growth in the area of wireless communications, a variety of different access technologies has emerged. For example, Code Division Multiple Access (CDMA) is a packet-based wireless-access technology that may be used in certain cellular phone systems. As another example, Wi-Fi is an access technology based on a series of specifications from the Institute of Electrical and Electronics Engineers (IEEE) called 802.11. Wi-Fi uses radio frequency and enables a wireless-enabled computer or PDA to connect to the Internet via a wireless access point. Yet another access technology being utilized today is commonly referred to as WiMax (Worldwide Interoperability for Microwave Access). WiMax, also known as the IEEE 802.16 group of standards, defines a packet-based wireless technology that provides high-throughput broadband connections over long distances.

With different access technologies in use today, a variety of problems currently exist in the art. For example, there exist problems associated with allowing devices utilizing different technologies to communicate with one another and allowing a mobile device to move between access technologies. Indeed, separate systems and/or networks are currently required to support IP connectivity for each individual access technology. This is because the standards bodies that created the standards for the different technologies individually created different requirements for IP connectivity over the various technologies. This approach generally requires a full IP handoff for devices moving between technologies. However, as service providers strive to deploy real time services across wireless infrastructures, it is becoming increasing important to minimize such IP handoffs. This is because the handoffs require additional signaling and registration elements, and they introduce extra routing hops and latency. This negative impact is exacerbated when a gateway level hand-off is required (i.e., if a user changes Radio Access Network (RAN) technologies or if a user crosses a RAN boundary). Accordingly, there is a need for improved mechanisms for efficiently establishing and maintaining connectivity with client devices over a plurality of access technologies.

SUMMARY

The present invention provides systems and methods for establishing connectivity over a plurality of access technologies. In one aspect of an embodiment of the present invention, a system is provided that includes a client device. The client device is configured to communicate by utilizing multiple access technologies. The system also includes a gateway in communication with the client device. The gateway includes a plurality of access technology termination nodes configured to support communications utilizing the multiple access technologies. A gateway assignment manager is also included in the system. This manager is configured to assign the client device to the gateway. The gateway assignment manager is further configured to maintain the assignment of the client device to the gateway when the client device switches from utilizing a first access technology to utilizing a second access technology.

In another aspect of an embodiment of the present invention, a computer-implemented method is provided for interacting with a mobile device capable of communicating over multiple access technologies. A request is received from the mobile device requesting to initiate a communication session over a first access technology. In response to this request, device identifiers associated with the mobile device are stored, and the device is assigned to a gateway for communications during the first communication session. Another request is then received from the mobile device requesting to initiate a second communication session over a second access technology. In response to this request, the gateway assigned to the mobile device is identified, and the device is reassigned to the same gateway for communications during the second communication session.

In yet another aspect of an embodiment of the present invention, a gateway-assignment manager is provided for maintaining the assignment of a client device to a gateway as the client device communications over a plurality of access technologies. The manager includes a first request receiving component configured to receive a first request from the client device to initiate a first communication session over a first access technology. The manager also includes a gateway assignment component configured to assign the client device to a gateway. Further, a data store included with the manager stores the gateway assigned to the client device, along with device identifiers associated with the client. The manger also includes a second request receiving component configured to receive a second request from the client device to initiate a second communication session over a second access technology. In response to such a second request, the gateway assignment component is configured to reassign the client device to the gateway for communications during the second communication session.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

Figure 1:
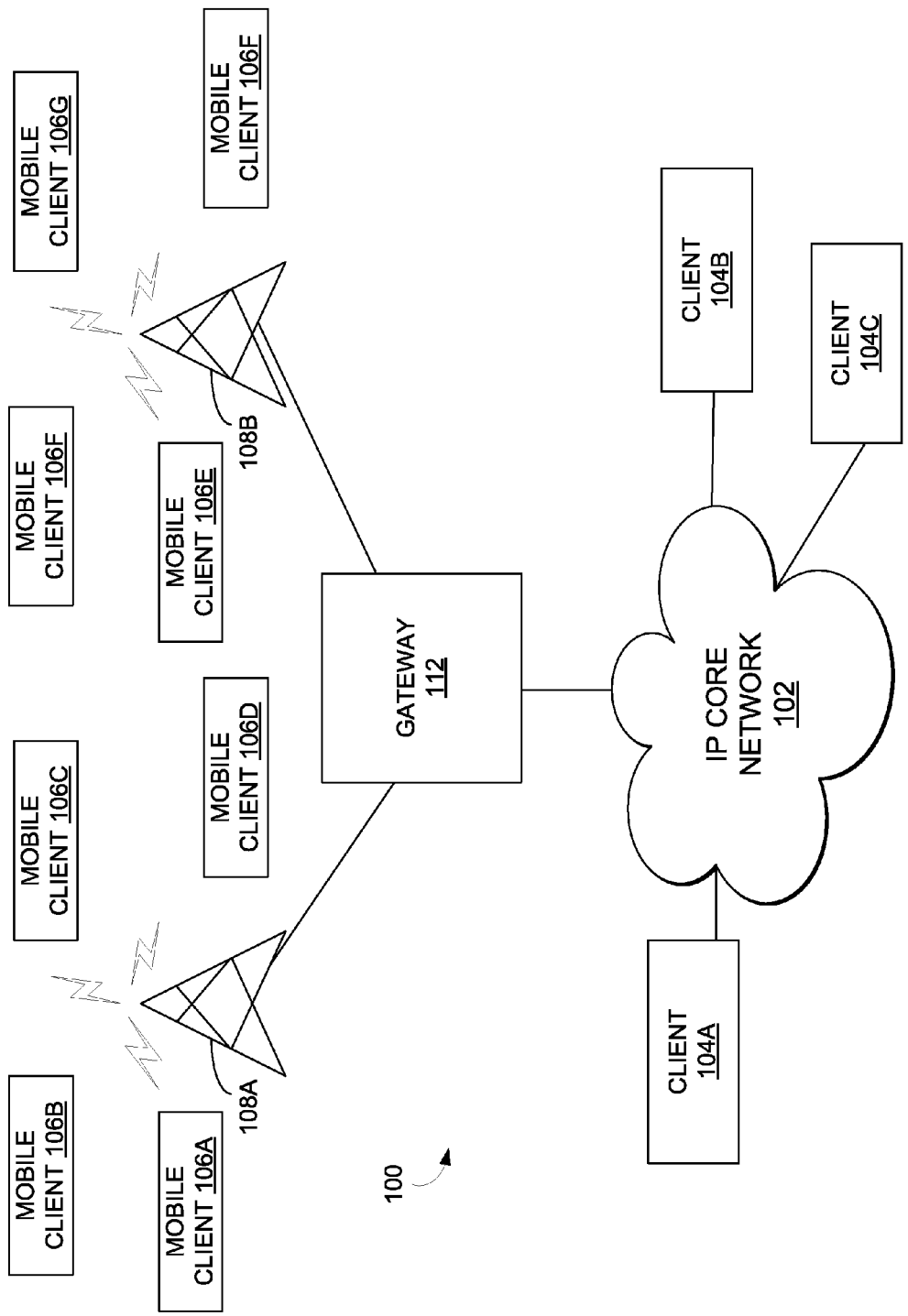
FIG. 1 is a block diagram of a network environment suitable for use in implementing the present invention.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for maintaining connectivity with client devices over a plurality of access technologies. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data. Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

The present invention may be practiced in any network environment such as a communications network. Such networks are widely used to connect various types of network elements, such as routers, servers, gateways, network telephones, and so forth. Further, the invention may be practiced in a multi-network environment having various, connected public and/or private networks. The networks may be wireless or wireline ("wired"). As will be appreciated by those skilled in the art, communication networks may take several of different forms and may use several different communication protocols.

FIG. 1 illustrates a network environment 100 that represents an exemplary environment in which the present invention may be practiced. It is important to note that network environments in which the present invention may operate may be arranged in a variety of configurations, and the network environment 100 of FIG. 1 provides only one exemplary network environment.

The network environment 100 includes an IP core network 102. The network 102 may be any network or combination of networks configured to provide communications between network devices. The network 102 provides communication services for clients 104A-104C. The clients 104A-104C may be any computing devices connected to the network 102, and each of the clients 104A-104C may have an address, such as an Internet protocol (IP) address, for uniquely identifying that client. The clients 104A-104C may interact with the network 102 to receive a variety of content such as voice, data or video.

The network environment 100 may also include a wireless communication system configured to provide communication services to mobile clients 106A-106F. In an exemplary wireless communication system, each mobile client 106A-106F may communicate via an air interface with a base transceiver station 108A or a base transceiver station 108B. The base transceiver stations 108A and 108B may be coupled to any number of different devices that enable connectivity with the network 102, the public Internet and/or a private intranet (e.g., a wireless carrier's core network). The base transceiver stations 108A and 108B may utilize any number of wireless access technologies or standards known in the art to communicate with the mobile clients 106A-106F.

In order to facilitate communication sessions originating from the mobile clients 106A-106F, the network environment 100 includes a gateway 112. As known to those skilled in the art, the gateway 112 may provide a variety of functions allowing clients to communicate with the IP core network 102. Such functions may vary based on the type of access technology being utilized by an originating client device. The gateway 112 may receive communication requests from the mobile clients 106A-106F, authenticate the clients and assign IP addresses. Further, as will be explained herein, the gateway 112 may also be used to establish and maintain connectivity with client devices over a plurality of access technologies.

Figure 2:
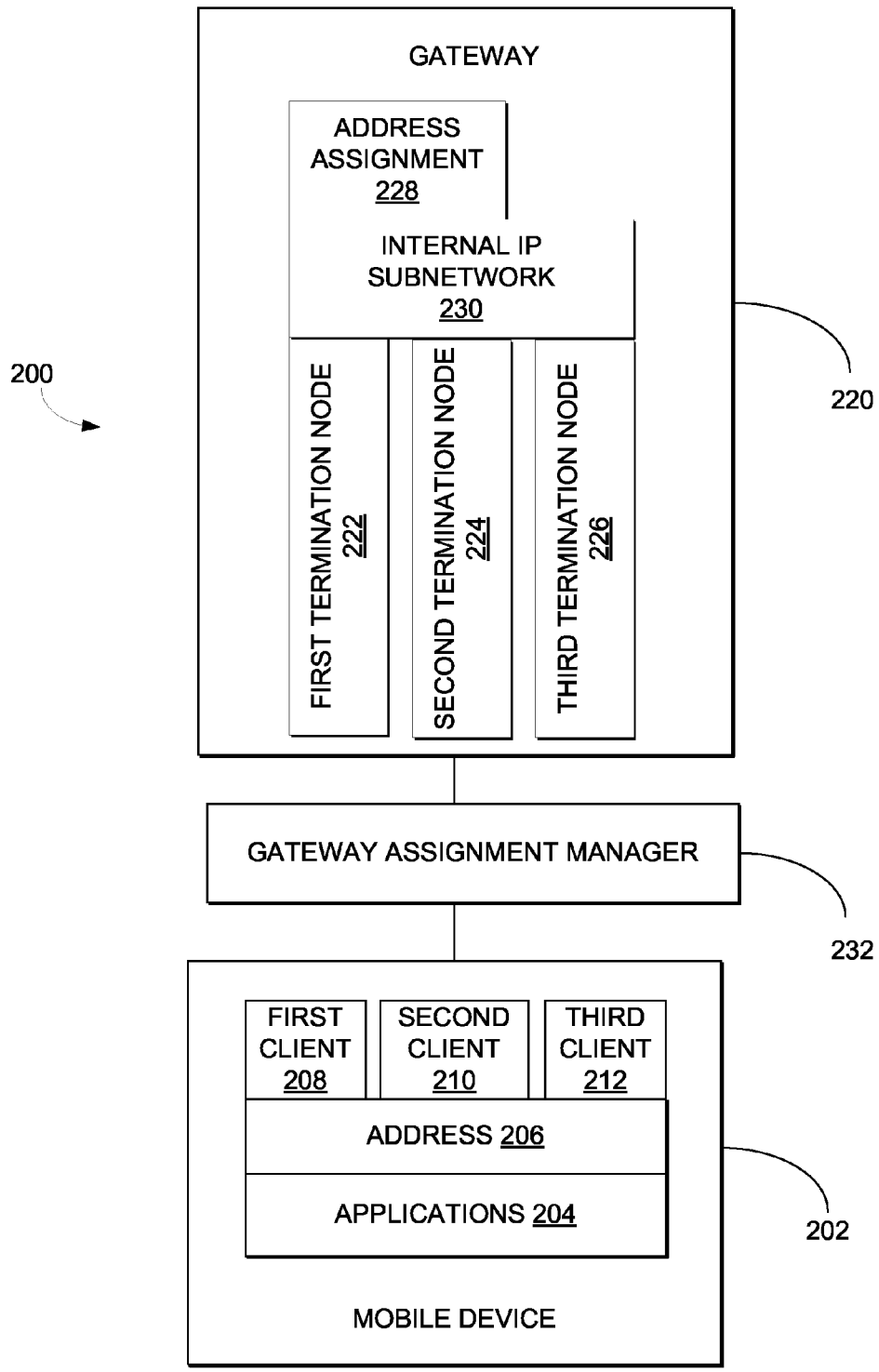
FIG. 2 is a schematic diagram representing a system in accordance with one embodiment of the present invention for establishing connectivity over a plurality of access network technologies.

FIG. 2 illustrates a system 200 for establishing connectivity over a plurality of access technologies. The system 200 includes a mobile communication device 202. The device 202 may be one of any number of devices capable of communicating wirelessly over an air interface. The device 202 may include applications 204 that run on the device 202. For example, the applications 204 may include a browsing application, such as a Wireless Application Protocol (WAP) browser. When initiated, the browser may receive content from a host device via the Internet (or other IP network).

To receive such content, the device 202 may be assigned an address 206, such as an IP address. The address 206 may be a unique identifier that allows the client device 202 to be identified and for packets to be broadcast to the device 202. In one embodiment, the address 206 is dynamically assigned to the client device 202 when it is authenticated to a network so as to allow exchange of communications between host devices and the client device 202.

In one embodiment, the mobile communication device 202 is capable of communicating over multiple wireless access technologies. For example, the device 202 includes three clients, clients 208, 210 and 212. Each of the clients 208, 210 and 212 provides support for a separate access technology. For example, the first client 208 may enable connectivity using CDMA, while the second client 210 may be enable WiFi communications. As will be appreciated by those skilled in the art, having multiple such clients on a single device may allow for greater flexibility/control in initiating and maintaining wireless connections. A variety of networking functions may be performed by the clients 208, 210 and 212. For example, the clients may include software configured to communicate with a gateway or other network elements.

To allow the client device 202 to send and receive communications via an IP network, the system 200 includes an access independent IP gateway 220. For example, the gateway 220 may be similar to the gateway 112 illustrated by FIG. 1 and may function as a terminating point for all bearer and signaling traffic entering a core IP network. Optionally, the gateway 220 may also support the following functions, which are known in the art: AAA (Authorization, Authentication, and Accounting) client; NAS (Network Access Server) device; IDS (Intrusion Detection System) access and enforcement point; hot-lining device; prepaid client; Foreign Agent (FA); a network mobility agent (to provides a mechanism for layer three (L3) mobility management between gateways without the need for Mobile IP signaling over the air); QoS enforcement point; policy enforcement point; NFCC (Network Firewall Configuration and Control) packet filter; and IAP (Intercept Access Point) (lawful Intercept). Any number of additional and/or related functions may also be performed by the gateway 220.

The gateway 220 includes three termination nodes, nodes 222, 224 and 226. Each of these nodes is associated with a different access network technology. For example, the first termination node 222 may receive communications when the device 202 is using CDMA, while the second termination node 206 may receive communications when the device 202 is using WiFi. In one embodiment, the first client 208 may to initiate a session that terminates a tunnel (Layer 2 or 3) at the node 222. A variety operations and protocols may facilitate such tunneling. The nodes also may provide a variety of functions, as required for a particular access technology.

As will be appreciated by those skilled in the art, there exists a set of common functions performed by each of the different access technologies. Because the gateway 220 supports at least three different access technologies, these common functions may be performed in a manner that is agnostic to the underlying access technology. Accordingly, the need for separate systems to support these common functions is minimized, along with the costs associated with devices moving between technologies.

As an example, a common function performed by each of the access technologies is the assignment of IP addresses. Instead of having disparate assignment procedures and individual subnetworks for each access technology, the gateway 220 includes an address assignment component 228 that assigns IP addresses (e.g., the address 206) to client devices in communication with the gateway 220. Such assignment of IP addresses allows devices using different access technologies with tunnels terminating at the nodes 222, 224 and 226 to plug into a common subnetwork 230. Thus, devices utilizing different access technologies may broadcast packet to one another directly over the subnetwork 230. As will be appreciated by those skilled in the art, such a common subnetwork minimizes IP handoffs and increases the network efficiency when providing real time services across a wireless infrastructure.

To enable seamless handoffs when the device 202 switches access technologies, the system 200 must ensure the various communication sessions initiated by the client device 202 each terminate at the same gateway (i.e., the gateway 220). As such, the system 200 includes a gateway assignment manager 232. The gateway assignment manager 232 is configured to maintain the assignment of the client device 202 to the gateway 220 as the client device 202 switches access technologies. In one embodiment, the gateway assignment manager 232 stores a device identifier associated with the client device 202 when it is first assigned to the gateway 220. For instance, the device identifier may be an International Mobile Subscriber Identity (IMSI) number. In addition to associating a device identifier and a gateway assignment, the gateway assignment manager 232 may also store the device 202's Media Access Control address (MAC address) and/or it's Network Access Identifier (NAI). These identifiers may be obtained from the device 202 or a remote database. When subsequent initiation requests from the client device 202 are transmitted, these requests may be received by the gateway assignment manager 232. Using the various stored identifiers, the gateway assignment manager 232 can ensure that subsequent communications sessions are handled by the gateway 220. As will be appreciated by those in the art, the system 200, by ensuring subsequent communication sessions are handled by the same gateway, can minimize the need for full Mobile IP handoffs.

Figure 3:
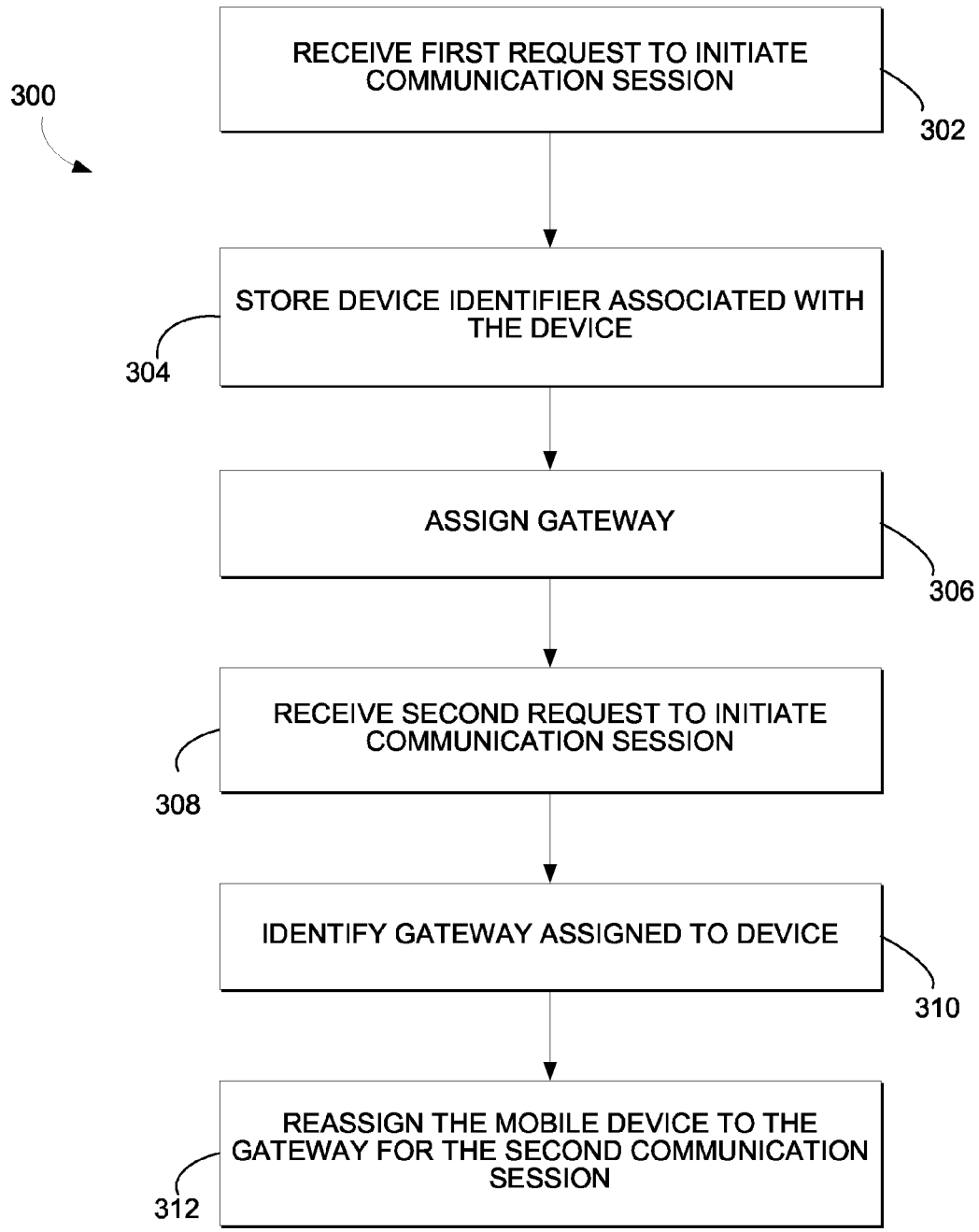
FIG. 3 illustrates a method in accordance with one embodiment of the present invention for allowing a mobile device to communicate over multiple wireless access technologies.

FIG. 3 illustrates a method 300 for allowing a mobile device to communicate seamlessly with a network while switching wireless access technologies. The method 300, at a step 302, receives a request to initiate a communication session. The request may originate from one of any number of different client devices equipped to communicate wirelessly with a network. The request may be formatted in accordance with any number of different protocols, and a variety of access technologies may be used to broadcast the request. Once sent from the client device, the request may be communicated amongst various element of the network before reaching an element configured to perform the method 300. In one embodiment, the request is forwarded to a device such as the gateway assignment manager 232 of FIG. 2.

At a step 304, one or more device identifiers associated with the client device are stored. For example, the IMSI number may be recorded. Further, other device identifiers (e.g. a MAC address or an NAI) may be obtained from local or remote databases. At a step 306, an access gateway is assigned to the client device. Thereafter, the device may communicate with the gateway in accordance with a first access technology.

Indicating a desire to switch access technologies, a second request to initiate a communication session may be received from the client device at a step 308. This second request may seek initiation of a session using a second access technology. In response to this second request, the method 300, at a step 310, identifies the gateway previously assigned to the device. In one embodiment, this identification relies on the one or more device identifiers stored at the step 304. At a step 312, the method 300 assigns the same gateway to the client device for communications during the second communication session. As previously discussed, the gateway may be configured to allow the device to seamlessly switch access technologies without the need for a full Mobile IP handoff.

Figure 4:
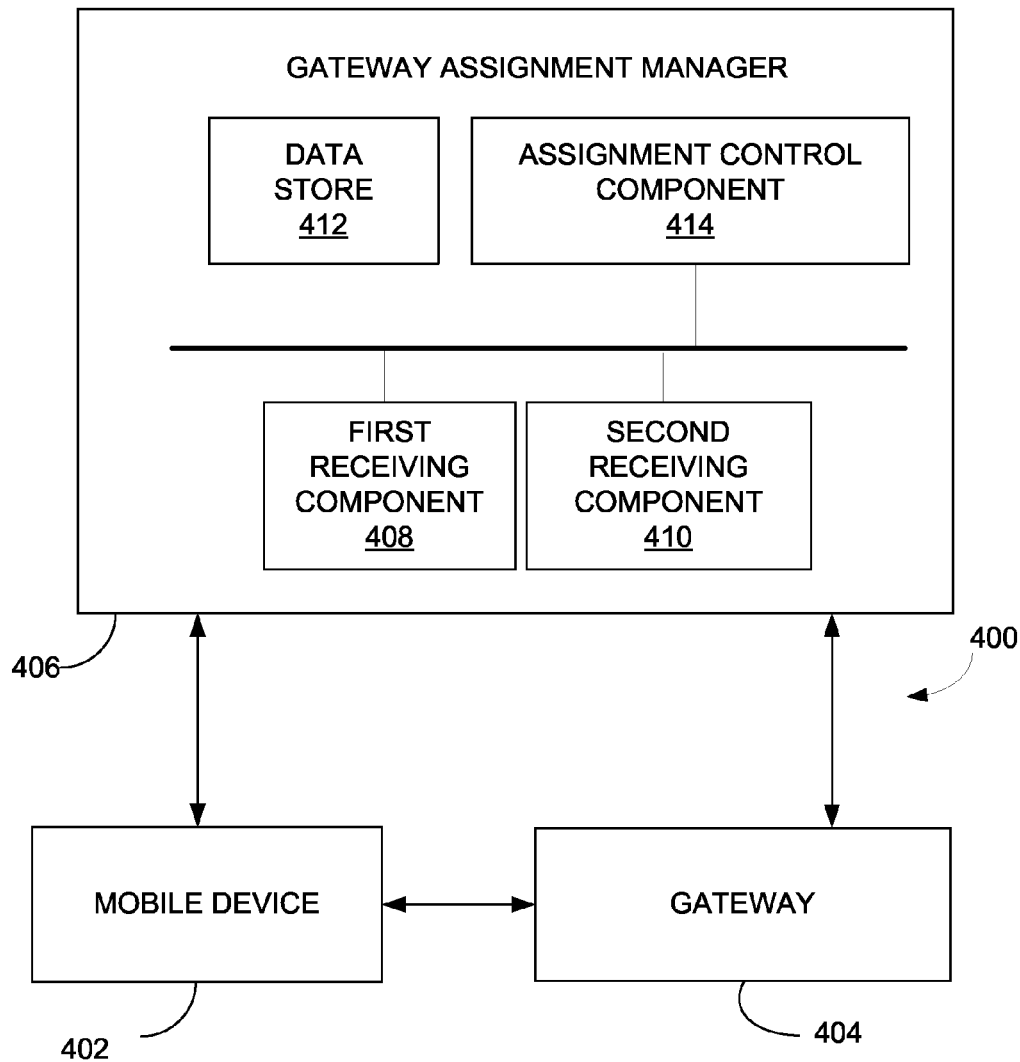
FIG. 4 is a schematic diagram representing a system in accordance with one embodiment of the present invention for establishing connectivity over a plurality of access network technologies.

FIG. 4 illustrates a system 400 for establishing connectivity over a plurality of access network technologies. The system includes a mobile device 402. The mobile device 402 may be one of any number of devices capable of communicating wirelessly over an air interface. In one embodiment, the mobile device 402 is capable of communicating over multiple wireless access technologies. For example, the mobile device 402 may be equipped with the means to communication using CDMA, WiFi and/or WiMax. The device 402 may also include applications for communicating and exchanging information with other devices on a network.

Regardless of the access technology utilized, the system 400 employs a gateway 404 to serve as the termination point for communication sessions originated from the mobile device 402. Any number of network devices may facilitate such communication between the mobile device 402 and the gateway 404. In one embodiment, the gateway 404 includes different termination nodes, and each of these nodes is associated with a different access network technology. For example, a first termination node may receive communications in accordance with WiFi, while a second termination node may receive communications in accordance with WiMax. In one embodiment, the mobile device 402 may initiate a session that terminates a tunnel (Layer 2 or 3) at one of the nodes. The nodes may provide a variety of functions, as required for a particular access technology. Further, the gateway 404 may include a router, which serves as the Layer 3 termination and which routes information from the device 402 to various elements of the gateway 404.

In the event the device 402 changes connectivity from a first access technology to a second access technology, the device 402 may communicate a negotiated address to the gateway 404 via the second access technology. The gateway 404 may recognize the device 402 and authenticate/register the device 402 in accordance with the second access technology. In such registration, the registration manager 416 may reassign the same IP address to the device 402. The device 402 may continue to use this address to communicate with the network. As will be appreciated by those skilled in the art, as the same IP address is used to identify the device 402, communications between the device 402 and another network devices will not be interrupted, despite the change in access technologies.

To enable such seamless handoffs when the device 402 switches access technologies, the system 400 includes a gateway assignment manager 406. The gateway assignment manager 406 ensures the various communication sessions initiated by the client device 402 each terminate at the same gateway (i.e., the gateway 404). The gateway assignment manager 406 includes a first receiving component 408 and a second receiving component 410. Each of these components is associated with a different access network technology. For example, the first receiving component 408 may receive communication initiation/registration requests for CMDA communications, while the second first receiving component 410 may receive communication initiation/registration requests for WiMax communications.

The gateway assignment manager 406 also includes a data store 412. The data store 412 is configured to store various device and user parameters associated with the device 402. For example, when a first registration request is received by the gateway assignment manager 406, the data store 412 may record one or more identifiers associated with the device 402.

The gateway assignment manager 406 also includes an assignment control component 414 that is configured to assign an access gateway, such as the gateway 404, to the device 402. This assignment may be tracked by the data store 412. When subsequent requests are received from the device 402, the assignment control component 414 may access the data store 412 to identify the gateway previously assigned to the device 402. Thereafter, the assignment control component 414 may reassign the device 402 to the gateway 404. In this manner, it may be ensured that the gateway 404 handles the various communication sessions initiated by the device 402.

Figure 5:
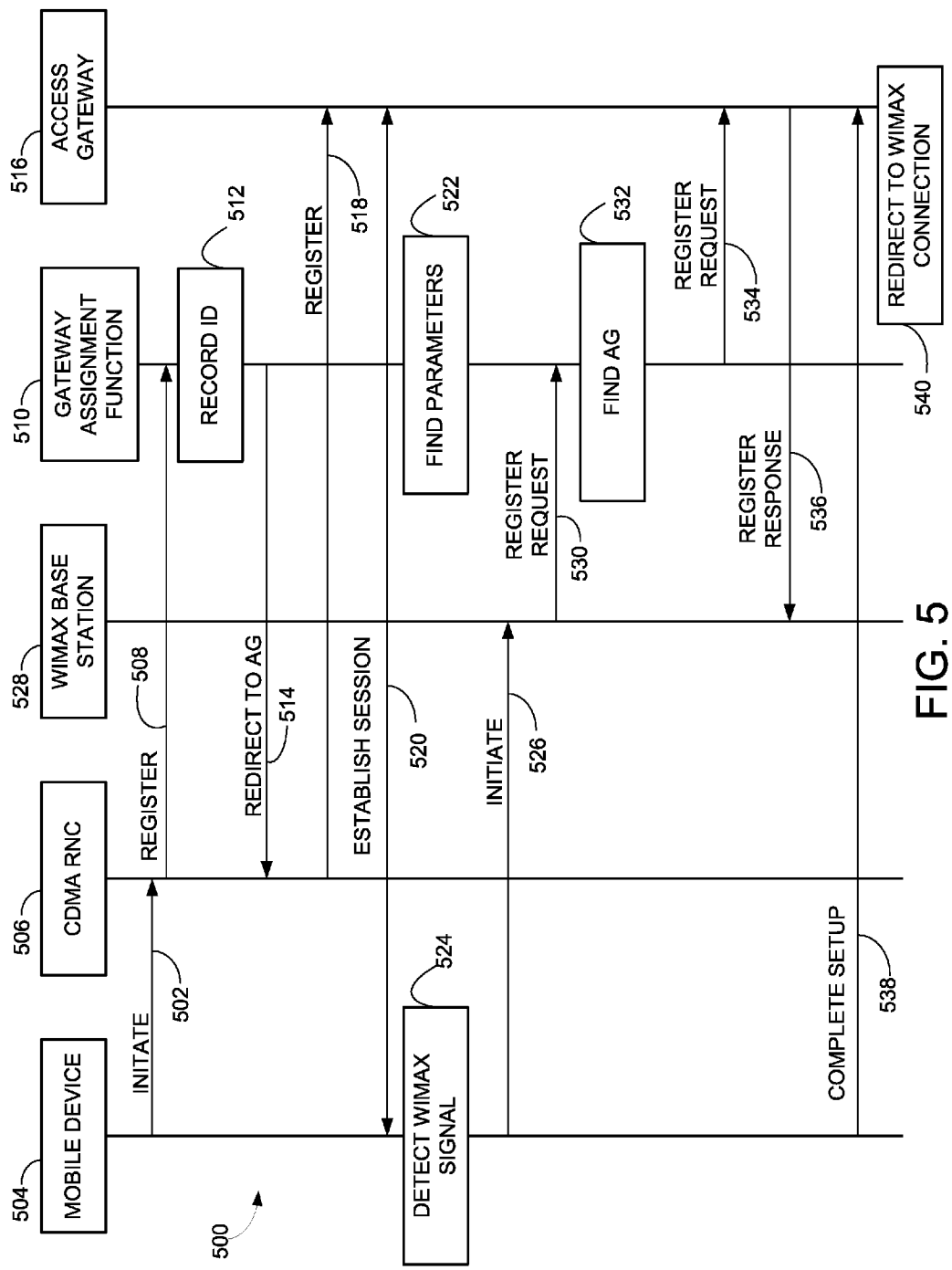
FIG. 5 illustrates a message flow diagram showing an example of session setup signaling in accordance with one embodiment of the present invention in which a device switches from CDMA communications to WiMax.

FIG. 5 illustrates a message flow diagram 500 showing an example of session setup signaling in accordance with one embodiment of the present invention in which a device switches from CDMA communications to WiMax. At a step 502, a mobile device 504 sends an initiation request to a CDMA Radio Network Controller (RNC) 506. The RNC 506 next sends a registration message to a gateway assignment function 510 at a step 508. The assignment function 510, at a step 512, records one or more identifiers associated with the device 504. Thereafter, at a step 514, a redirect message is sent to the RNC 506. This redirect message identifies an access gateway 516. At a step 518, a registration message is sent from the RNC 506 to the gateway 516. At a step 520, a CDMA session is established between the mobile device 504 and the gateway 516.

At a step 522, the assignment function 510 accesses a database and uses the recorded device identifier(s) to obtain various user parameters, such as a MAC address and a NAI. To switch to WiMax communications, the device 504, at a step 524, detects a WiMax signal and sends an initiate connection request at a step 526. This request is received by a WiMax base station 528. At a step 530, the station 528 sends a data path registration request to the assignment function 510. The assignment function 510, at a step 532, finds the current gateway assigned to the device 504. Thereafter, at a step 534, the function 510 sends a data path registration request to the gateway 516. At a step 536, a data path registration response is sent from the gateway 516 to the WiMax base station 528. At a step 538, the mobile device 504 completes the session step-up. For example, the device 504 may send an IP address request for the same IP address or a foreign agent may send an agent advertisement for the same care-of address. Finally, at a step 540, the gateway 516 redirects the session to a WiMax connection. As previously discussed, this redirection may be accomplished without a full Mobile IP handoff.

Figure 6:
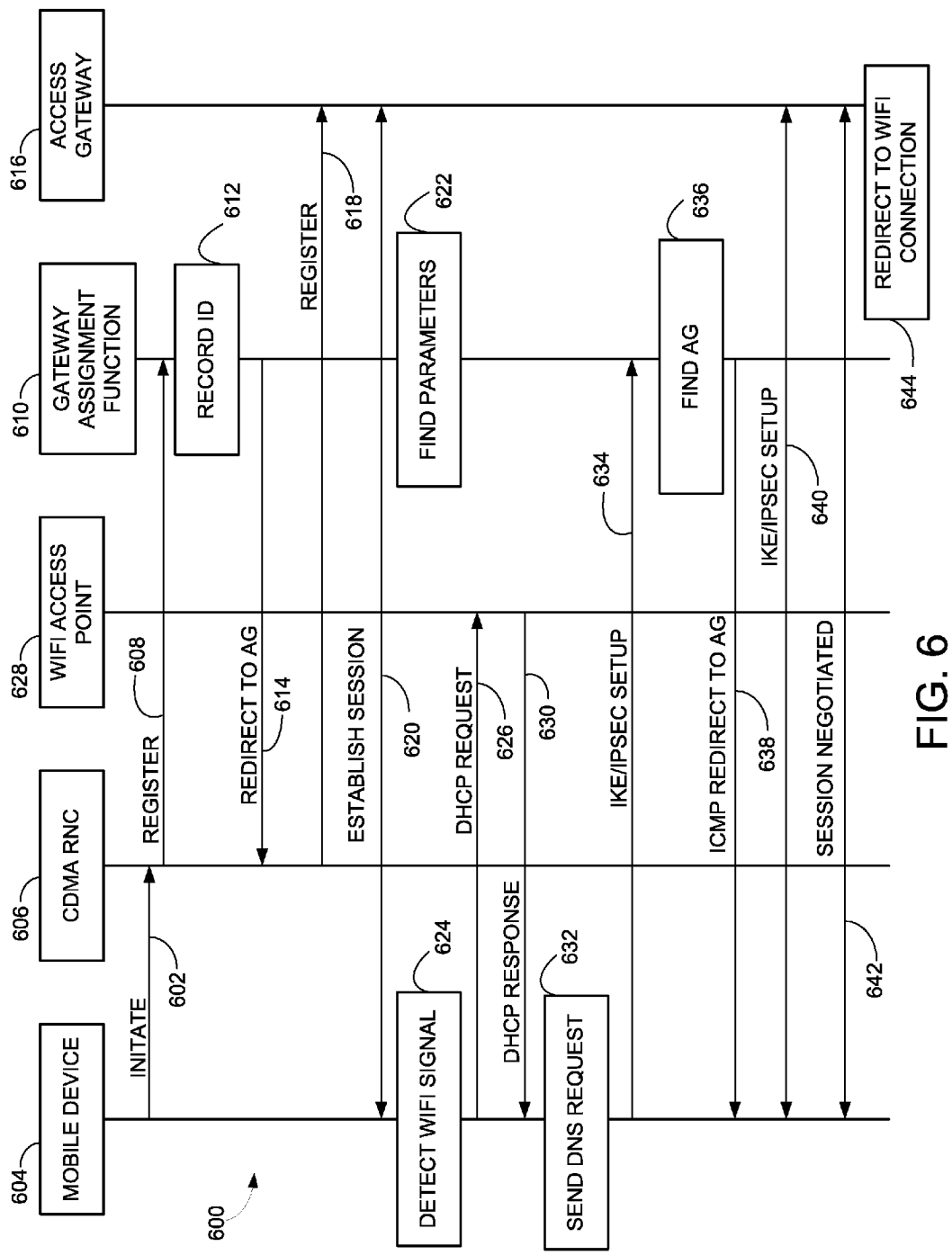
FIG. 6 illustrates a message flow diagram showing an example of session setup signaling in accordance with one embodiment of the present invention in which a device switches from CDMA communications to WiFi.

FIG. 6 illustrates a message flow diagram 600 showing an example of session setup signaling in accordance with one embodiment of the present invention in which a device switches from CDMA communications to WiFi. At a step 602, a mobile device 604 sends an initiation request to a CDMA RNC 606. The RNC 606 next sends a registration message to a gateway assignment function 610 at a step 608. The assignment function 610, at a step 612, records one or more identifiers associated with the device 604. Thereafter, a redirect message is sent to the RNC 606 at a step 614. This redirect message identifies an access gateway 616. A registration message is sent from the RNC 606 to the gateway 616 at a step 618. At a step 620, a CDMA session is established between the mobile device 604 and the gateway 616. At a step 622, the assignment function 610 accesses a database and uses the recorded device identifier(s) to obtain various user parameters, such as a MAC address and a NAI.

To switch to WiFi communications, the device 604, at a step 624, detects a WiFi signal and sends a DHCP request for a local IP address at a step 626. This request is received by a WiFi access point 628. The access point 628 sends a DHCP response with a local address back to the device 604 at a step 630. At a step 632, the device 604 sends a DNS request for the IP address of the gateway assignment function 610. Thereafter, at a step 634, the device 604 sends an IKE/IPSec setup message to the assignment function 610. The assignment function 610, at a step 636, finds the current gateway assigned to the device 604. At a step 638, the function 610 sends the device 604 an ICMP redirect message that refers to the gateway 616. At a step 640, the device 604 sends an IKE/IPSec setup message to the gateway 616. A WiFi session is then negotiated at a step 642. In one embodiment, the home address for the CDMA session is negotiated to be the Tunnel Inner Address for the WiFi session. At a step 644, the gateway 616 redirects the session to a WiMax connection. Here again, this redirection may be accomplished without a noticeable interruption in communications and without a full Mobile IP handoff.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A system for establishing connectivity over a plurality of access network technologies, the system comprising: a client device configured to communicate over a network by utilizing a first wireless access interface and by utilizing a second wireless access interface; and a gateway in communication with said client device via said network for providing packet data to said client device, said gateway comprising: a common internal IP subnetwork residing in said gateway; a first wireless access interface termination node configured to communicate with said client device over said first wireless access interface, wherein said first wireless access interface termination node is further configured to terminate a first tunnel initiated by said client device into said common internal IP subnetwork residing in said gateway; a second wireless access interface termination node configured to communicate with said client device over said second wireless access interface, wherein said second wireless access interface termination node is further configured to terminate a second tunnel initiated by said client device into said common internal IP subnetwork residing in said gateway; and a gateway assignment manager configured to assign said client device to said gateway and said common internal IP subnetwork residing thereon, wherein said gateway assignment manager is further configured to maintain, without performing an IP-level handoff, the assignment of said client device to said gateway and said common internal IP subnetwork residing thereon when said client device switches from utilizing said first wireless access interface to utilizing said second wireless access interface.

2. The system of claim 1, wherein said client device is a mobile communications device, and wherein said gateway enables said client device to communicate over an IP network.

3. The system of claim 1, wherein at least one of said first wireless access interface and said second wireless access interface are selected from a list including: Code Division Multiple Access (CDMA); IEEE 802.3 interfaces; IEEE 802.11 interfaces; and IEEE 802.16 interfaces.

4. The system of claim 1, wherein said client device is further configured to transmit a first request to initiate a first communication session over a first wireless access interface and to transmit a second request to initiate a second communication session over a second wireless access interface.

5. The system of claim 4, wherein said gateway assignment manager is further configured to receive said first request and said second request.

6. The system of claim 5, wherein said gateway assignment manager further comprises a database for storing one or more parameters associated with said client device in response to said first request.

7. The system of claim 6, wherein said gateway assignment manager is further configured to access said database in response to said second request to identify said gateway assigned to said client device.

8. The system of claim 1, wherein said gateway is further configured to provide uninterrupted communications between said client device and a host device while said client device switches between utilizing said first wireless access interface and utilizing said second wireless access interface.

9. A computer-implemented method for interacting with a mobile device capable of communicating over multiple access technologies, the method comprising: receiving from said mobile device a first request to initiate a first communication session over a first wireless access interface; storing in a data store at least one device identifier associated with said mobile device; assigning said mobile device to a gateway for communications during said first communication session, wherein said gateway provides packet data to said mobile device and includes a common internal IP subnetwork residing in said gateway; utilizing a first wireless access interface termination node of said gateway to communicate with said mobile device over a first wireless access interface, wherein said first wireless access interface termination node terminates a first Layer 2 or Layer 3 tunnel initiated by said mobile device into said common internal IP subnetwork of said gateway; receiving from said mobile device a second request to initiate a second communication session over a second wireless access interface; identifying the gateway assigned to said mobile device by accessing said data store; utilizing a second wireless access interface termination node of said gateway to communicate with said mobile device over a second wireless access interface, wherein said second wireless access interface termination node terminates a second Layer 2 or Layer 3 tunnel initiated by said mobile device into said common internal IP subnetwork of said gateway; switching to use of said second wireless access interface without performing a gateway-level handoff; and maintaining the assignment of said mobile device to said gateway and said common internal IP subnetwork residing therein for communications during said second communication session.

10. The method of claim 9, wherein said at least one device identifier includes an International Mobile Subscriber Identity (IMSI) number.

11. The method of claim 9, further comprising maintaining uninterrupted communications between said mobile device and a host device while switching to use of said second wireless access interface.

12. The method of claim 9, further comprising switching to use of said second wireless access protocol without performing an IP-level handoff.

13. The method of claim 9, wherein said mobile device includes one or more applications that include mobile IP functionality.

14. A gateway-assignment manager for maintaining the assignment of a client device to a gateway as the client device communicates over a plurality of access technologies, the manager comprising: a first request receiving component configured to receive a first request from the client device to initiate a first communication session over a first wireless access interface; a gateway assignment component configured to assign said client device to a gateway for communications during said first communication session, wherein said gateway provides packet data to said client device and includes a common internal IP subnetwork residing in said gateway, a first wireless access interface termination node configured to terminate a first tunnel initiated by said first request from said client device into said common internal IP subnetwork residing in said gateway, and a second access interface termination node configured to terminate a second tunnel initiated by a second a request from said client device into said common internal IP subnetwork residing in said gateway; a data store configured to store at least one device identifier associated with said client device and to store the gateway assigned to said client device by the gateway assignment component; and a second request receiving component configured to receive a second request from the client device to initiate a second communication session over a second wireless access interface; wherein said gateway assignment component is further configured to respond to said second request by accessing said data store to identify the gateway and common internal IP subnetwork previously assigned to said client device and to reassign said client device to said gateway, and said common internal IP subnetwork residing therein, for communications during said second communication session without performing an IP-level handoff.

15. The manager of claim 14, wherein at least one of said first wireless access interface and said second wireless access interface are selected from a list including: Code Division Multiple Access (CDMA); IEEE 802.3 interfaces; IEEE 802.11 interfaces; and IEEE 802.16 interfaces.

16. The manager of claim 14, wherein said at least one device identifier includes an International Mobile Subscriber Identity (IMSI) number.

17. The manager of claim 14, wherein said at least one device identifier includes a Media Access Control (MAC) address.

18. The manager of claim 14, wherein at least a portion of said at least one device identifier is obtained from a remote data store and at least a portion of said at least one device identifier is obtained from said client device.

19. The manager of claim 14, wherein said gateway assignment component is further configured to facilitate the initiation of said first and said second communication sessions between said client device and said gateway.

* * * * *